Sept. 22, 1964    R. K. BEVAN ETAL    3,150,375
SELECTIVE DIRECTIONAL SLOTTED WAVEGUIDE ANTENNA
Filed July 20, 1962    2 Sheets-Sheet 1

*INVENTORS*
ROBERT K. BEVAN
PETER R. CLOUD
JOHN KOWALSKY

ATTORNEY

3,150,375
SELECTIVE DIRECTIONAL SLOTTED WAVEGUIDE ANTENNA

Robert K. Bevan, Tarrytown, N.Y., Peter R. Cloud, West Acton, Mass., and John Kowalsky, Brewster, N.Y., assignors to General Precision, Inc., a corporation of Delaware
Filed July 20, 1962, Ser. No. 211,322
7 Claims. (Cl. 343—768)

This invention relates to a microwave multibeam antenna composed of a planar assembly of linear arrays.

In some aircraft microwave systems several beams of pulsed microwave radiation are directed toward the earth and Doppler information is extracted from their echoes. From this information can be developed navigational data such as aircraft ground speed, drift angle and vertical velocity. In order to minimize data distortions caused by the difference in reflections from land and water, each beam is split into two intersecting lobes, alternately radiated. One form of antenna for these purposes is the subject of this invention.

The planar antenna of this invention is stabilized or automatically maintained pointing in the direction of the aircraft velocity vector. The antenna emits four microwave beams which, in level flight, are directed downward with two beams angled forward and outward and striking the earth on opposite sides of the ground track and equally distant therefrom. The other two beams are pointed backward and outward at angles equal to the forward angles. Each beam is dual, consisting of two intersecting lobes alternately radiated and positioned along a fore and aft conic contour. Both beams on the right of the ground track are radiated simultaneously, alternating with those on the left.

The planar antenna comprising two interleaved planar arrays in a single plane. Each planar array comprises an equal number of linear arrays, absorbingly terminated at one end and fed at the other end. Each linear array is made of rectangular hollow waveguide and is provided with a plurality of radiators consisting of slots cut in one of its narrow sides. Each planar array is fed from a single feed waveguide bordering one side of the rectangular planar array. Each feed waveguide may be fed at either end, the two ends being connected to a lobing microwave switch which connects them in alternation to the microwave power source.

The microwave beam lobes are radiated in alternation by this described feeding of each feed waveguide in alternation at its two ends. This method of lobing produces lobes in which the sigma ($\sigma$) angle between the transverse antenna axis and any lobe is invariant, resulting in highly accurate antenna operation.

U.S. Patent No. 2,967,301 describes relations between the aircraft velocity, the microwave beam properties, the frequency of the Doppler information and the general design of the antenna of this invention. It also describes how the microwave radiation angles are made to be independent of changes in the microwave frequency.

One purpose of this invention is to provide an improved microwave antenna for use with aircraft Doppler navigational systems.

Another purpose is to provide such an aircraft antenna for use as part of a Doppler system which may be used for measuring ground speed, drift angle and vertical velocity.

Another purpose is to provide such an antenna radiating four dual beams of microwave radiation.

Another purpose is to provide such an antenna including microwave switches emitting eight lobes of radiation in a selected time-speed pattern.

Another purpose is to provide such an antenna in which the angle $\sigma$ is held constant during lobe switching.

A more complete understanding of this invention may be secured from the detailed description and drawings, in which.

Figure 1:
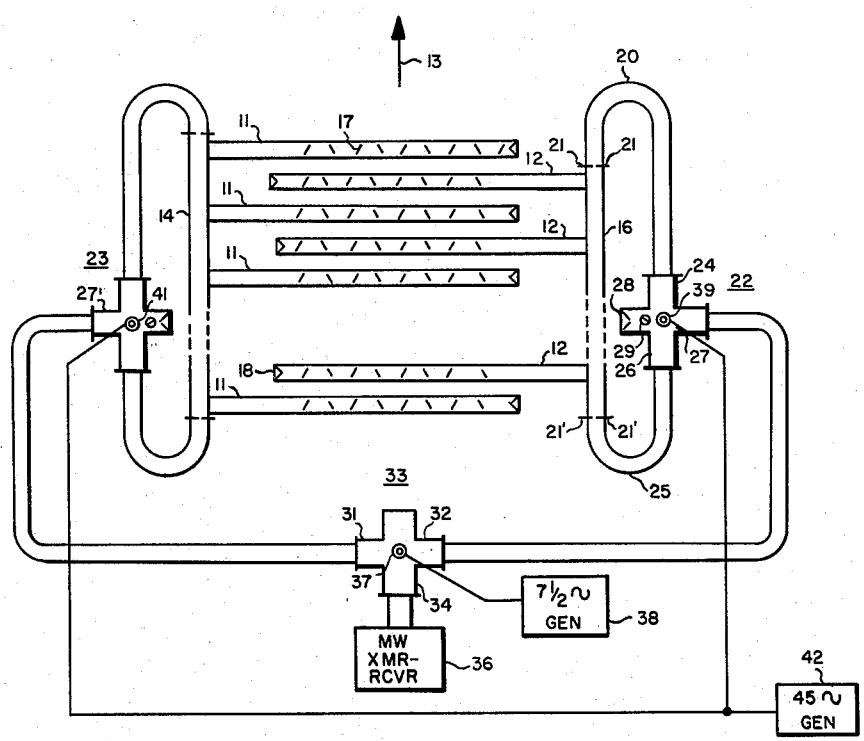
FIGURE 1 is a bottom view of the antenna of this invention.

Referring now to FIGURE 1, two sets of identical, parallel microwave linear arrays, 11 and 12, are interleaved to form a planar array, there being at least two linear arrays in each set. The planar array is installed in an aircraft and is stabilized so that its longitudinal axis is maintained in the direction of the aircraft velocity relative to the earth. This velocity direction, shown in FIGURE 1 by the arrow 13, is in the planar array plane and is perpendicular to the linear arrays.

The set of linear arrays 11 is fed from a feed waveguide 14 which is perpendicular to all of the linear arrays of the set and the set 12 is fed from a feed waveguide 16 perpendicular to the linear arrays. All of the linear arrays are similar. Each has a plurality of slot radiators, such as slot radiator 17, in one edge or narrow face which, in operation, faces downward. These slots alternate in slant sense so that the couplings are successively positive and negative thereby providing antiphase arrays. The degree of coupling varies from end to end of each linear array to provide gable illumination. The slot spacings are equal and have such value that a half cone of radiation is generated in the direction toward the feed end having a cone apex half angle $\sigma$. Each linear array is terminated at the end opposite to its feed end in a microwave absorbing element consisting of a small, lossy pyramid of polyiron or similar material, such as the element 18, in order to absorb the microwave energy and prevent reflection from the end of the linear array. Each linear array is thus of the traveling-wave type.

Figure 2:
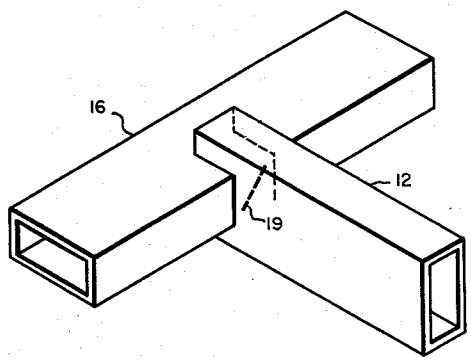
FIGURE 2 is a view of a shunt-series microwave transition employed to feed the linear arrays comprising the antenna of the invention.

Each feed waveguide is coupled to each of the linear arrays which it feeds by a shunt-series coupling such as shown in FIGURE 2, in which the feed waveguide 16 is provided with a shunt slot, indicated by the dashed lines 19, through which energy is fed to the linear array 12'. The coupling senses are alternately positive and negative along the feed waveguide. Each feed waveguide is provided with iris openings near the points of connection of the first and last linear array, as indicated by the fins 21, FIGURE 1. The purpose of these iris openings is to match the input waveguide bend impedance to that of the loaded feed waveguide.

Each feed waveguide is fed at either end through a lobing switch, 22 and 23. Each lobing switch consists of a four-port, reciprocal ferrite switch operating on the principle of Faraday rotation. Two of the ports, for example those represented by the arms 24 and 26 of switch 22, are connected through waveguide bends 20 and 25 to the two ends of the feed waveguide 16. The length of each connecting waveguide, 20 and 25, is adjusted to insure proper terminating impedance as more fully described hereinafter. A third port, 27, is employed to introduce microwave energy when transmitting and to receive microwave energy from the antenna when receiving echo signals. The fourth port, 28, is blind and is terminated internally by a lossy pyramid. A tuning screw 29 is provided in the fourth arm containing this port.

The input arms 27 and 27' of the lobing switches 22 and 23 are connected through waveguides to arms 31 and 32 of a right-left microwave switch 33. The third arm 34 of this switch is connected to a microwave transmitter-receiver 36. The energizing terminal 37 of the right-left switch 33 is connected to a 7½ c.p.s. generator 38. The energizing terminals 39 and 41 of the lobing switches 22 and 23 are connected in parallel to the output of a 45 c.p.s. generator 42.

Figure 3:
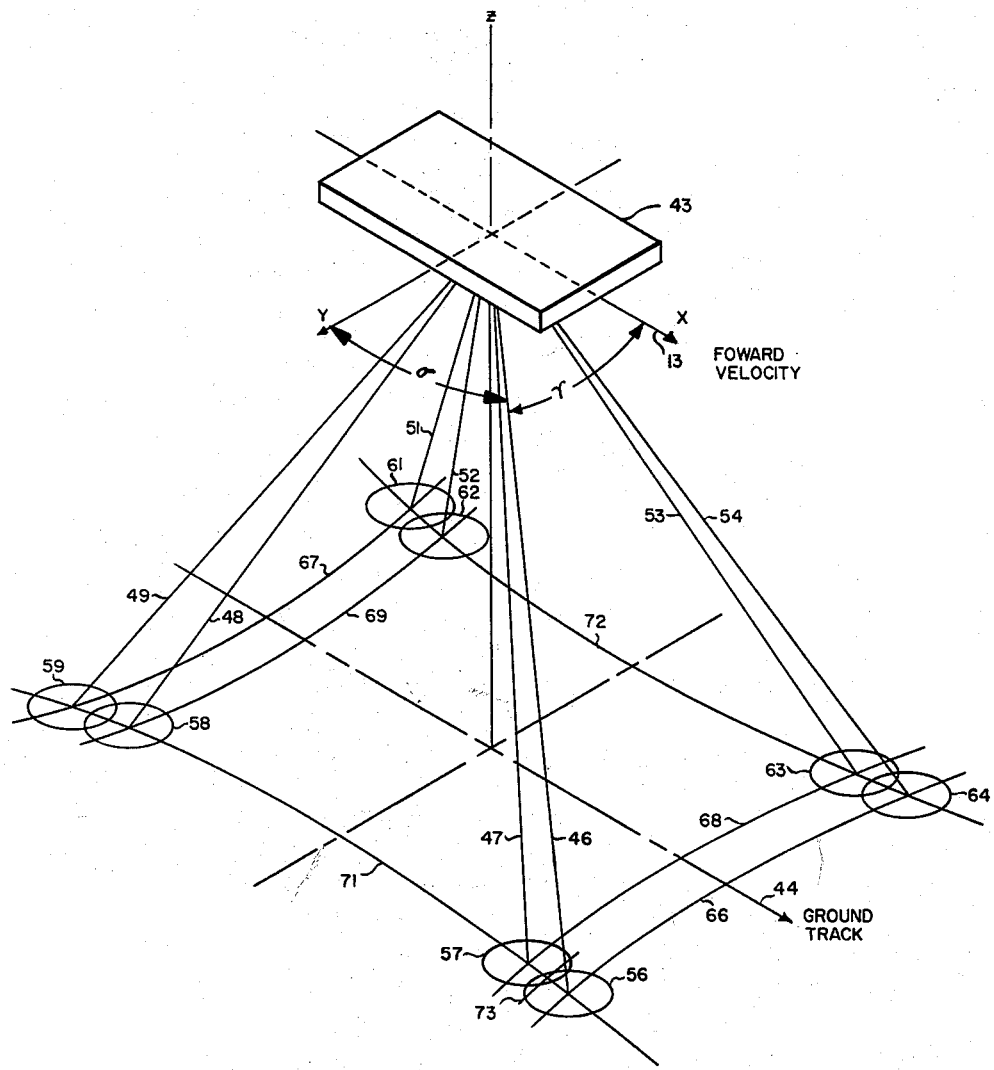
FIGURE 3 is an isometric view showing the beams and lobes emitted by the antenna.

FIGURE 3 depicts the ground pattern of the antenna. The microwave antenna 43 of the invention is indicated with its active planar surface facing downward and, to simplify description, is indicated with the longitudinal axis X of this surface parallel to the earth ground track 44 and pointing in the direction of the aircraft forward velocity. The antenna's transverse axis Y is in the active antenna surface and perpendicular to the axis X.

The antenna emits at selected times eight lobes of radiation indicated by the lobe center lines 46, 47, 48, 49, 51, 52, 53 and 54. Each lobe has an approximately circular cross-section of about 4 degrees diameter and illuminates a circle on the earth as indicated at 56, 57, 58, 59, 61, 62, 63 and 64. These circles intersect in pairs. Each intersecting pair of lobes such as, for example, lobes 46 and 47, is termed a beam.

The two forward lobes, 46 and 54, may be considered as elements of a radiated half cone having the antenna forward axis as it axis. Such a cone intersects the earth in a hyperbola 66, the cone half angle being designated $\gamma$. A similar cone, having the same angle $\gamma$, comprehends the two aft lobes and produces the earth intersection hyperbola 67. The beams 47 and 53 similarly illuminate spots on a hyperbola 68 and beams 48 and 52 illuminate spots on a hyperbola 69. In a similar manner, the beams 49, 48, 47 and 46 may be considered as elements of a side half cone of apex half angle $\sigma$ having the hyperbolic earth intersection 71. The beams 51, 52, 53 and 54 similarly illuminate four spots on the hyperbolic earth intersection 72.

The production of the eight lobes of radiation is intimately related to the production of longitudinal and lateral half cones of radiation. For example, the intersection of a forward cone, such as that forming the hyperbola 66, with a side cone indicated by the hyperbola 71, is indicated by the spot 56. At this intersection the cone radiations are in phase and only here do they reinforce each other, resulting in what is termed a lobe 46 of radiation illuminating the spot 56.

At any instant only two lobes are radiated. Lobes 46 and 48 are radiated simultaneously, alternating at a rate of 45 c.p.s. with radiation of the two lobes 47 and 49. After a period the radiation is shifted to the left lobes, the pair 52/54 alternating with the pair 51/53 at the 45 c.p.s. rate. The right-left shift occurs at a rate of 7½ c.p.s.

In the lobing shift at 45 c.p.s. when the radiation shifts from lobe pair 49/47 to pair 48/46 the forward angle $\gamma$ is decreased and the after angle $\gamma$ is increased. This changes the Doppler frequency, $f_D$, contained in the received microwave energy in accordance with the equation in which V is aircraft speed and $\lambda$ is the microwave wavelength. This lobing operation produces Doppler signals in which abberations due to operation over water are minimized and in which the angle $\gamma$ used in the equation is that at the center of intersection of the two lobes. This center of intersection is indicated in FIGURE 3 by the line 73.

If, in lobing, as in shifting the radiation between lobes 46 and 47, the angle $\sigma$ is changed, it has an effect on the received Doppler frequency. Therefore, for the highest accuracy of measurement of the Doppler frequency and through it of the aircraft ground speed, it is necessary that, in lobing, the angle $\sigma$ be held constant. It will be shown later that the antenna of this invention performs lobe switching without changing the angle $\sigma$.

In the operation of the antenna, the right-left microwave switch 33, FIGURE 1, is operated by the 7½ cycle generator 38 so that the linear array set 12 is energized for 1/15 second, then the set 11 is energized for 1/15 second, in continuous alternation. The lobing switches 22 and 23 are operated from the lobing generator 42 at 45 cycles so that, for example, microwave transmitting energy is applied to one end of the feed waveguide 16 for 1/90 second, and, then is switched to the other end for 1/90 second. The feed to the linear array set 12 is thus effected from the feed waveguide 16 continuously during 1/15 second, but the feed waveguide is energized in alternation at its two ends.

This effects lobe switching in the following manner. In order to radiate simultaneously two fore and aft half cones having equal $\gamma$ angles it is necessary that the linear arrays of set 12 be secured to the feed waveguide 16 at equal intervals equalling the dimension of one wavelength within the feed waveguide, $\lambda_g$. If the spacing is increased by $e$, so that each interval is $\lambda_g + e$, and feed is at the forward end of the feed waveguide, the forward angle $\gamma$ will be increased and the after angle $\gamma$ will be decreased. If, however, feed is at the after end of the feed waveguide, this increased spacing will cause the after angle $\gamma$ to be increased and the forward angle $\gamma$ to be decreased. The $\lambda_g$ spacing may also be decreased by the increment E, although mechanical and space considerations make it preferable to depart from $\lambda_g$ spacing by an increased increment.

Each of the feed waveguides 14 and 16 therefore has the spacings of its slots for feeding the linear arrays, and the positions of their attachments, increased to more than $\lambda_g$ by such amount that changing the end of feed to the feed waveguide shifts the forward and after cone half angles by a little less than the lobe diameter, or about 3 degrees.

In this lobe switching, the side cone radiation half angle $\sigma$ is substantially unchanged because this half angle $\sigma$ depends solely on the spacings of the radiating slots in the individual linear arrays of the set. Thus the half angle $\sigma$ of the side half cone radiated by the set 12 depends on the average spacing of the slots in this set. These spacings are designed to be identical and vary only by the small amounts due to manufacturing inaccuracy. Since the same set is used to produce both lobes, and the average spacing remains identical, the angle $\sigma$ is the same in the production of both lobes.

In energizing the feed waveguides, as for example energizing feed waveguide 16 at its forward end, with iris 21 absent, a cumulative input impedance mismatch would be seen due to the abstractions of energy by the several linear array feeds along the feed waveguide 16. This would occur even though the terminal end were terminated in the characteristic impedance of the feed waveguide. Accordingly, the iris 21 is inserted to eliminate this input impedance mismatch. However, since the structure is to be used symmetrically, an identical iris 21' must be inserted at the terminal end. It now becomes necessary to employ a tuning screw 29, and to apply spacers to adjust the lengths of waveguide bends 20 and 25 slightly to minimize terminal mismatch.

In operation, when feeding from the forward end the input energy is matched at iris 21 and passes through the feed waveguide, where it successively feeds the several linear arrays, and a residual amount of energy leaves the feed waveguide through iris 21' and enters the waveguide 25. This energy enters the arm 26 of the lobing switch 22, which directs the energy to the blind arm 28. Because of the adjusted length of the waveguide 25 and the adjustment of the tuning screw 29, the impedance seen by the energy in passing from the feed waveguide 16 to the waveguide 25 is equal to the feed waveguide characteristic impedance, so that substantially no energy is reflected back into the feed waveguide.

What is claimed is:

1. A microwave antenna array for an aircraft comprising, at least four parallel linear arrays positioned in a plane, said linear arrays being composed of rectangular waveguide sections provided with microwave radiators along one face thereof, a first feed waveguide connected to alternate ones of said linear arrays at one end thereof, the connections between the ends of said linear arrays and said first feed waveguide being spaced along the length thereof by a distance which departs from the wavelength of the energy in the first feed waveguide by a selected increment, a second feed waveguide connected to the remaining ones of said linear arrays at ends which are opposite to the ends of the alternate linear arrays connected to said first feed waveguide, the connections between the ends of the remaining ones of said linear arrays and said second feed waveguide being spaced along the length thereof by a distance which departs from the wavelength of the energy in the second feed waveguide by said selected increment, means for alternately applying microwave energy to said first and second feed waveguides, and means for alternately applying said microwave energy to opposite ends of said first and second feed waveguides.

2. A microwave antenna array for an aircraft comprising, at least four parallel linear arrays positioned in a plane, said linear arrays being composed of rectangular waveguide sections provided with microwave radiators spaced along one narrow face thereof, a first feed waveguide connected to alternate ones of said linear arrays at one end thereof, the connections between the ends of said linear arrays and said first feed waveguide being spaced along the length thereof by a distance which departs from the wavelength of the energy in the first feed waveguide by a selected increment, the opposite ends of said alternate linear arrays being terminated by microwave energy absorbing elements, a second feed waveguide connected to the remaining ones of said linear arrays at the ends thereof which are adjacent the absorbing terminations of said alternate linear arrays, the connections between the ends of the remaining ones of said linear arrays and said second feed waveguide being spaced along the length thereof by a distance which departs from the wavelength of the energy in the second feed waveguide by a selected increment, the opposite ends of said remaining linear arrays being terminated by microwave energy absorbing elements, means for alternately applying microwave energy to said first and second feed waveguides, and means for alternately applying said microwave energy to opposite ends of said first and second feed waveguides.

3. A microwave antenna array for an aircraft comprising, at least four parallel linear arrays positioned in a plane, said linear arrays being composed of rectangular waveguide sections provided with microwave radiators along one face thereof, a first feed waveguide connected to alternate ones of said linear arrays at one end thereof, the connections between the ends of said linear arrays and said first feed waveguide being spaced along the length thereof by a distance equal to the wavelength of the energy in the first feed waveguide plus a selected increment, a second feed waveguide connected to the remaining ones of said linear arrays at ends which are opposite to the ends of the alternate linear arrays connected to said first feed waveguide, the connections between the ends of the remaining ones of said linear arrays and said second feed waveguide being spaced along the length thereof by a distance equal to the wavelength of the energy in the second feed waveguide plus said selected increment, means for alternately applying microwave energy to said first and second feed waveguides, and means for alternately applying said microwave energy to opposite ends of said first and second feed waveguides.

4. A microwave antenna array for an aircraft comprising, at least four parallel linear arrays positioned in a plane, said linear arrays being composed of rectangular waveguide sections provided with microwave radiators spaced along one narrow face thereof, a first feed waveguide connected to alternate ones of said linear arrays at one end thereof, the connections between the ends of said linear arrays and said first feed waveguide being spaced along the length thereof by the wavelength of the energy in the first feed waveguide plus a selected increment, the opposite ends of said alternate linear arrays being terminated by microwave energy absorbing elements, a second feed waveguide connected to the remaining ones of said linear arrays at the ends thereof which are adjacent the absorbing terminations of said alternate linear arrays, the connection between the ends of the remaining ones of said linear arrays and said second feed waveguide being spaced along the length thereof by a distance equal to the wavelength of the energy in the second feed waveguide plus said selected increment, the opposite ends of said remaining linear arrays being terminated by microwave energy absorbing elements, means for alternately applying microwave energy to said first and second feed waveguides, and means for alternately applying said microwave energy to opposite ends of said first and second feed waveguides.

5. A microwave antenna array for an aircraft comprising, at least four parallel linear arrays positioned in a plane, said linear arrays being composed of rectangular waveguide sections provided with microwave radiators along one face thereof, a first feed waveguide connected to alternate ones of said linear arrays at one end thereof, the connections between the ends of said linear arrays and said first feed waveguide being spaced along the length thereof by a distance equal to the wavelength of the energy in the first feed waveguide plus a selected increment, a second feed waveguide connected to the remaining ones of said linear arrays at ends which are opposite to the ends of the alternate linear arrays connected to said first feed waveguide, the connections between the ends of the remaining ones of said linear arrays and said second feed waveguide being spaced along the length thereof by a distance equal to the wavelength of the energy in the second feed waveguide plus said selected increment, means for alternately applying microwave energy to said first and second feed waveguides at a first selected rate, and means for alternately applying microwave energy to opposite ends of said first and second feed waveguides at a second selected rate which is greater than said first selected rate.

6. A microwave antenna array for an aircraft comprising, at least four parallel linear arrays positioned in a plane, said linear arrays being composed of rectangular waveguide sections provided with microwave radiators spaced along one narrow face thereof, a first feed waveguide connected to alternate ones of said linear arrays at one end thereof, the connections between the ends of said linear arrays and said first feed waveguide being spaced along the length thereof by the wavelength of the energy in the first feed waveguide plus a selected increment, the opposite ends of said alternate linear arrays being terminated by microwave energy absorbing elements, a second feed waveguide connected to the remaining ones of said linear arrays at the ends thereof which are adjacent the absorbing terminations of said alternate linear arrays, the connections between the ends of the remaining ones of said linear arrays and said second feed waveguide being spaced along the length thereof by a distance equal to the wavelength of the energy in the second feed waveguide plus said selected increment, the opposite ends of said remaining linear arrays being terminated by microwave energy absorbing elements, means for alternately applying microwave energy to said first and second feed waveguides at a first selected rate, and means for alternately applying microwave energy to opposite ends of said first and second feed waveguides at a second selected rate which is greater than said first selected rate.

7. A microwave antenna array for an aircraft comprising, at least four parallel antiphase linear arrays positioned in a plane, a first feed waveguide connected to alternate ones of said antiphase linear arrays at one end thereof, the connections between the ends of said antiphase linear arrays and said first feed waveguide being spaced along the length thereof by a distance which equals the wavelength of the energy in the first feed waveguide plus a selected increment, the opposite ends of said alternate linear arrays being terminated by microwave energy absorbing elements, a second feed waveguide connected to the remaining ones of said antiphase linear arrays at the ends thereof which are adjacent the absorbing terminations of said alternate antiphase linear arrays, the connections between the ends of the remaining ones of said antiphase linear arrays and said second feed waveguide being spaced along the length thereof by a distance which equals the wavelength of the energy in said second feed waveguide plus said selected increment, the opposite ends of said remaining antiphase linear arrays being terminated by microwave energy absorbing elements, means for alternately applying microwave energy to said first and second feed waveguides at a first selected rate, and means for alternately applying microwave energy to opposite ends of said first and second feed waveguides at a second selected rate which is greater than said first selected rate.

References Cited in the file of this patent

UNITED STATES PATENTS

| | | |
|---|---|---|
| 2,932,823 | Beck et al. | Apr. 12, 1960 |
| 2,967,301 | Rearwin | Jan. 3, 1961 |
| 2,981,944 | Washburne | Apr. 25, 1961 |

FOREIGN PATENTS

| | | |
|---|---|---|
| 855,262 | Great Britain | Nov. 30, 1960 |